United States Patent [19]

Nakahara et al.

[11] Patent Number: 5,041,983
[45] Date of Patent: Aug. 20, 1991

[54] METHOD AND APPARATUS FOR SEARCHING FOR ROUTE

[75] Inventors: Naoji Nakahara, Nagoya; Keiji Kuzuya, Okazaki, both of Japan

[73] Assignee: Aisin Seiki K. K., Aichi, Japan

[21] Appl. No.: 501,914

[22] Filed: Mar. 30, 1990

[30] Foreign Application Priority Data

Mar. 31, 1989 [JP] Japan .................................. 1-082275

[51] Int. Cl.$^5$ ............................................. G06F 15/50
[52] U.S. Cl. ................................... 364/449; 340/990; 340/995
[58] Field of Search ..................... 364/443, 444, 449; 73/178 R; 340/988, 990, 995

[56] References Cited

U.S. PATENT DOCUMENTS

| 4,301,506 | 11/1981 | Turco | 364/444 |
| 4,546,439 | 10/1985 | Esparza | 364/444 |
| 4,570,227 | 2/1986 | Tachi et al. | 364/444 |
| 4,757,455 | 7/1988 | Tsunoda et al. | 364/449 |
| 4,796,189 | 1/1989 | Nakayama et al. | 364/444 |
| 4,878,170 | 10/1989 | Zeevi | 364/444 |
| 4,926,336 | 5/1990 | Yamada | 364/444 |
| 4,937,753 | 6/1990 | Yamada | 364/449 |

Primary Examiner—Gary Chin
Attorney, Agent, or Firm—Sughrue, Mion, Zinn, Macpeak & Seas

[57] ABSTRACT

There are disclosed an apparatus and a method for searching for the optimum route to be followed by a vehicle. The apparatus comprises a memory storing road maps, a keyboard having keys, and a microcomputer. The driver of the vehicle specifies a starting point and a destination in a network of roads displayed on a color CRT. Then, the microcomputer searches the network for a route which connects the starting point to the destination at the shortest distance.

1 Claim, 10 Drawing Sheets

FIG. 3b

|   | MP | F | Nc | Td | Tg |
|---|----|---|----|----|----|
| 1 |    |   |    |    |    |
| 2 |    |   |    |    |    |
| 3 |    |   |    |    |    |
| 4 |    |   |    |    |    |
| 5 |    |   |    |    |    |
| 6 |    |   |    |    |    |
| 7 |    |   |    |    |    |
| 8 |    |   |    |    |    |

FIG. 3c

|   | MP | Nc | Td |
|---|----|----|----|
| 1 | —  | S  | 0  |
| 2 | S  | 1  | 1  |
| 3 | 1  | 5  | 2  |
| 4 | 5  | 4  | 3  |
| 5 |    |    |    |
| 6 |    |    |    |
| 7 |    |    |    |
| 8 |    |    |    |

FIG. 3d

|   | MP | F | Nc | Td | Tg |
|---|----|---|----|----|----|
| 1 |    |   |    |    |    |
| 2 |    |   |    |    |    |
| 3 |    |   |    |    |    |
| 4 |    |   |    |    |    |
| 5 |    |   |    |    |    |
| 6 |    |   |    |    |    |
| 7 |    |   |    |    |    |
| 8 |    |   |    |    |    |

FIG. 3e

|   | MP | Nc | Td |
|---|----|----|----|
| 1 | —  | D  | 0  |
| 2 | D  | 3  | 1  |
| 3 | 3  | 4  | 2  |
| 4 |    |    |    |
| 5 |    |    |    |
| 6 |    |    |    |
| 7 |    |    |    |
| 8 |    |    |    |

FIG. 5
| Jun. No. | Coord | Data on Connection |
|---|---|---|
| 0 | $(X_0, Y_0)$ | $L_{(1)}, L_{(2)}$ |
| 1 | $(X_1, Y_1)$ | $L_{(1)}, L_{(2)}, \cdots$ |
| 2 | $(X_2, Y_2)$ | $L_{(1)}, \cdots$ |
| 3 | $(X_3, Y_3)$ | $L_{(1)}, \cdots$ |
| 4 | $(X_4, Y_4)$ | $L_{(1)}, \cdots$ |
|  |  |  |
|  |  |  |
|  |  |  |
FIG. 6
| m | Jun. No. |
|---|---|
| 0 | LN(0) |
| 1 | LN(1) |
| 2 | LN(2) |
| 3 | LN(3) |
| 4 |  |
|  |  |
|  |  |
|  |  |
FIG. 7
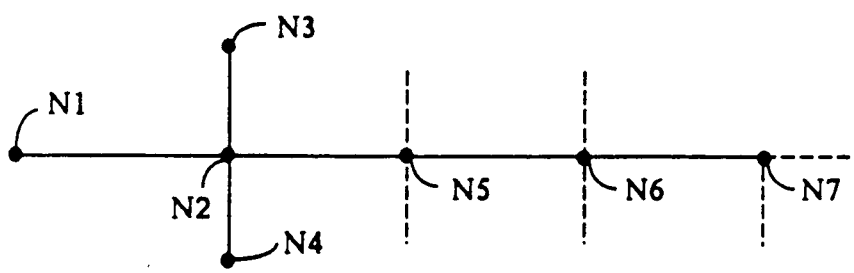
FIG. 8
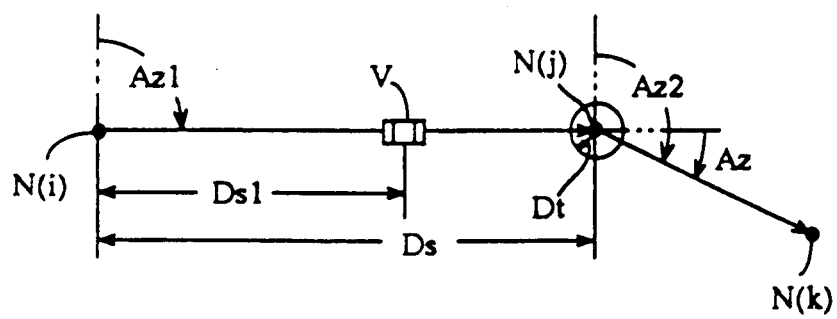

METHOD AND APPARATUS FOR SEARCHING FOR ROUTE

FIELD OF THE INVENTION

The present invention relates to techniques for searching for the optimum route followed by a vehicle such as an automobile.

BACKGROUND OF THE INVENTION

Sometimes an automobile moves through a strange region while the driver or a passenger is following the present location on a road map. There exists an apparatus which automates manual operations of this type. This apparatus comprises a map display unit, a detector for detecting the orientation of the automobile, and a means for detecting the distance traveled. After the starting location is entered and the vehicle is started, the present location of the automobile is constantly presented on the map display unit.

In this case, the information presented on the map display unit is only the present location of the automobile. Therefore, the driver or a passenger must discover a road extending to the target location.

In an attempt to solve this drawback, some apparatus have been proposed in Japanese Patent Laid-Open Nos. 195,113/1984 and 195,790/1984. When any one of these apparatus are used, an intended route is manually entered before the departure. This intended route is displayed on a map display unit, together with the present location of the automobile. These apparatus dispense with or simplify the search for the optimum route while the automobile is running. This enables the automobile to go more smoothly.

Some attempts have been made to automate the setting of the intended route, for providing more useful apparatus. An apparatus of this kind is disclosed in Japanese Patent Laid-Open No. 11,499/1985. In this apparatus, every point in a network of roads is regarded as a destination. An apparatus installed on the automobile calculates the shortest distance from every accessible point to each destination. The calculated distance is stored in a memory installed on the automobile. Whenever the automobile crosses a road junction, requisite information is read from the memory and displayed.

Although the detected area is restricted, it is necessary to search the area for the information about every road contained in the area, i.e., interconnection between junctions and distances between them. Then, data about the shortest route to the destination must be stored. For this reason, an exorbitant amount of calculation and a large capacity of memory are needed.

SUMMARY OF THE INVENTION

It is an object of the present invention to provide a technique for searching for the optimum route with the least amount of processing.

This object is achieved in accordance with the present invention by a method comprising the steps of: searching for routes which connect a first point to a second point at short estimated distances, using information about a network of roads for a vehicle, while accumulating the distance from the first point when the first and second points are specified in the network; and then selecting a route that can get the quickest access to the second point.

In this method, an apparatus searches for the optimum route while adding a weight to the accumulated distance from the first point according to the estimated distance to the second point. Therefore, as the search continues, the searched area is narrowed. Then, as shown in FIG. 9a, an egg-shaped area is searched around the second point. That is, a directional search is made to thereby greatly reduce the amount of processing.

In this case, the same search is made from both first and second points. Then, the route is determined from two roads that extend from the two points and meet first. Thus, the aforementioned egg-shaped searched area is limited by two curves drawn on opposite sides, as shown in FIG. 9b. In the simplest example, the searched area is halved as compared with the case in which the area is searched only from one side.

Where information about the positions of junctions of roads for vehicles and information about interconnection between the roads are used, the apparatus searches for a route connected with the first point while accumulating the distance from either the first point or the second point whenever a new road junction is encountered. This permits the processing to be performed discretely. Hence, the amount of processing is reduced further.

Other objects and features of the invention will appear in the course of the description thereof which follows.

BRIEF DESCRIPTION OF THE DRAWINGS

FIGS. 3b–3e are tables of data;

FIG. 5 is a table of data about road junctions;

FIG. 6 is a table of data about connection of roads;

FIG. 7 is a diagram illustrating one example of interconnection of road junctions;

FIG. 8 is a diagram illustrating the principle on which the present location and the direction of turning are detected;

DETAILED DESCRIPTION OF THE INVENTION

Figure 1:
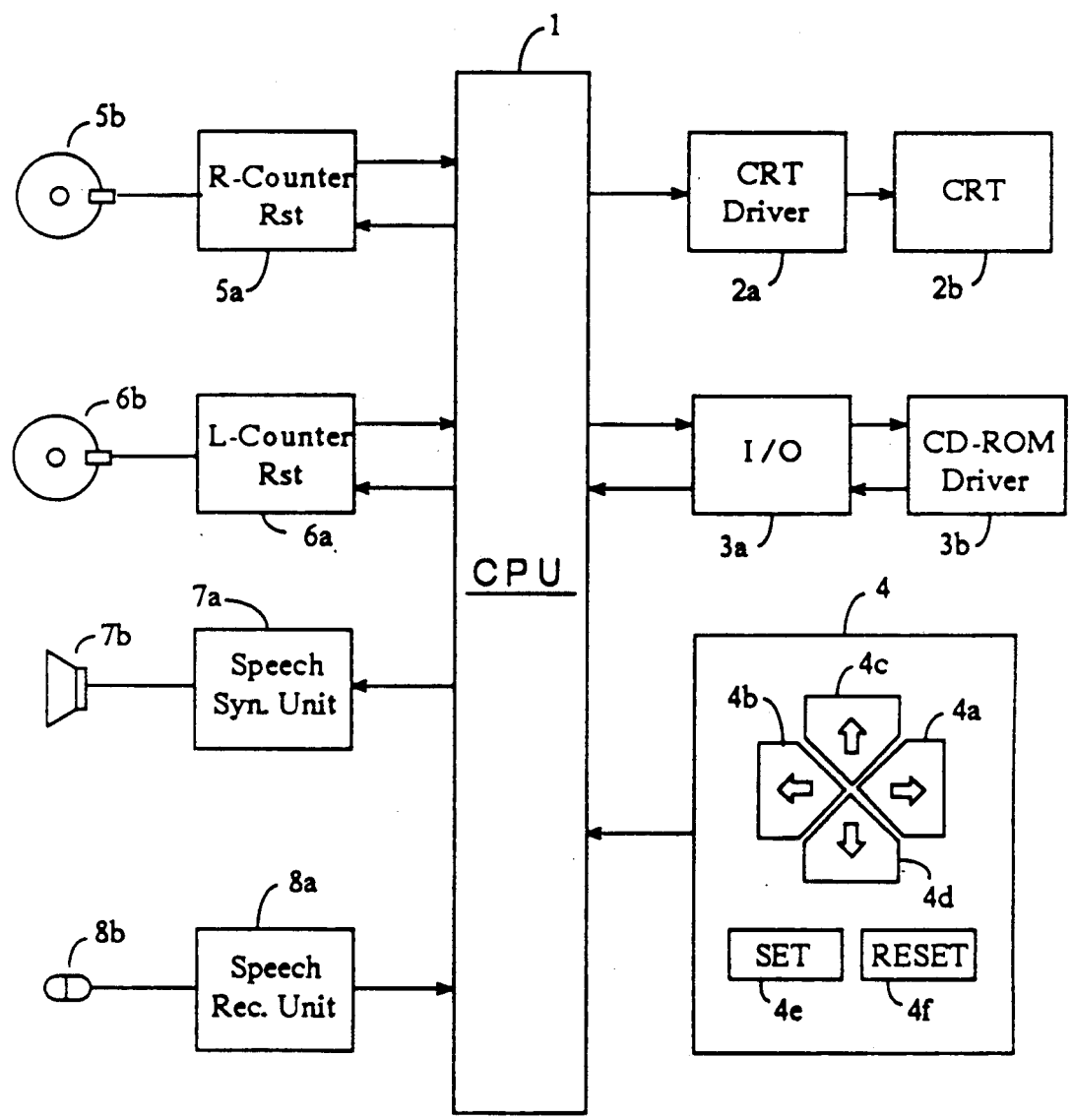
FIG. 1 is a block diagram of an automotive navigational system according to the invention.

Referring to FIG. 1, there is shown an automotive navigational system according to the invention. This system consists principally of a microcomputer (or CPU) 1, a CRT driver 2a, a color CRT 2b, an interface circuit (or I/O circuit) 3a, a CD-ROM driver 3b, a keyboard 4 for entering data, counters 5a, 6a, rotary pulse generators 5b, 6b, a speech synthesizer unit 7a, a loudspeaker 7b, a speech recognition unit 8a, and a microphone 8b. This system includes two power supplies (not shown) one of which always energizes the CPU 1.

The CRT driver 2a incorporates a character generator and provides a display of a road map, routes, the present location of the automobile, and/or characters on the color CRT 2b according to the instruction signals from the CPU 1. The CRT 2b is installed in the center of the dashboard inside the automobile.

Data about road maps is stored in the CD-ROM. As the need arises, the CPU 1 controls the CD-ROM driver 3b via the I/O circuit 3a to read map data from the CD-ROM. The keyboard 4 is mounted close to the color CRT 2b and has six keys 4a, 4b, 4c, 4d, 4e, 4f.

The rotary pulse generators 5b and 6b are coupled to the axle shafts of the right rear wheel and the left rear wheel, respectively. Whenever each shaft makes one revolution, the corresponding pulse generator produces about 20 pulses of a pulse duration corresponding to a distance of about 10 cm traveled by each wheel.

The R counter 5a counts pulses delivered from the pulse generator 5b, while the L counter 6a counts pulses produced by the pulse generator 6b.

The speed synthesizer unit 7a selects one message from several prepared messages under the instruction from the CPU 1 and reproduces it through the loudspeaker 7b.

The speech recognition unit 8a recognizes the speech entered through the microphone 8b. The entered message is any one of "Migi (Right in Japanese)", "Hidari (Left in Japanese)", and "Sonomama (Straight in Japanese)". The recognition unit 8a senses which of these messages is entered, according to the number of syllables.

This system operates either in navigational mode for guiding routes or in tracking mode in which only the present location is displayed. In either mode, the starting point is specified. Then, a road junction crossed first is designated. At this time, the system operates in the tracking mode. If a target point is specified, then a recommended route to the destination is automatically selected, and the system operates in the navigational mode. In the navigational mode, if the vehicle comes close to a road junction at which the vehicle should be turned to the right or to the left, the speaker 7b reproduces the message "Please turn to the right." or "Please turn to the left.". If the car gets out of the correct route, then the message "The vehicle went out of the route." is reproduced. Subsequently, the system operates in the tracking mode.

Figure 2A:
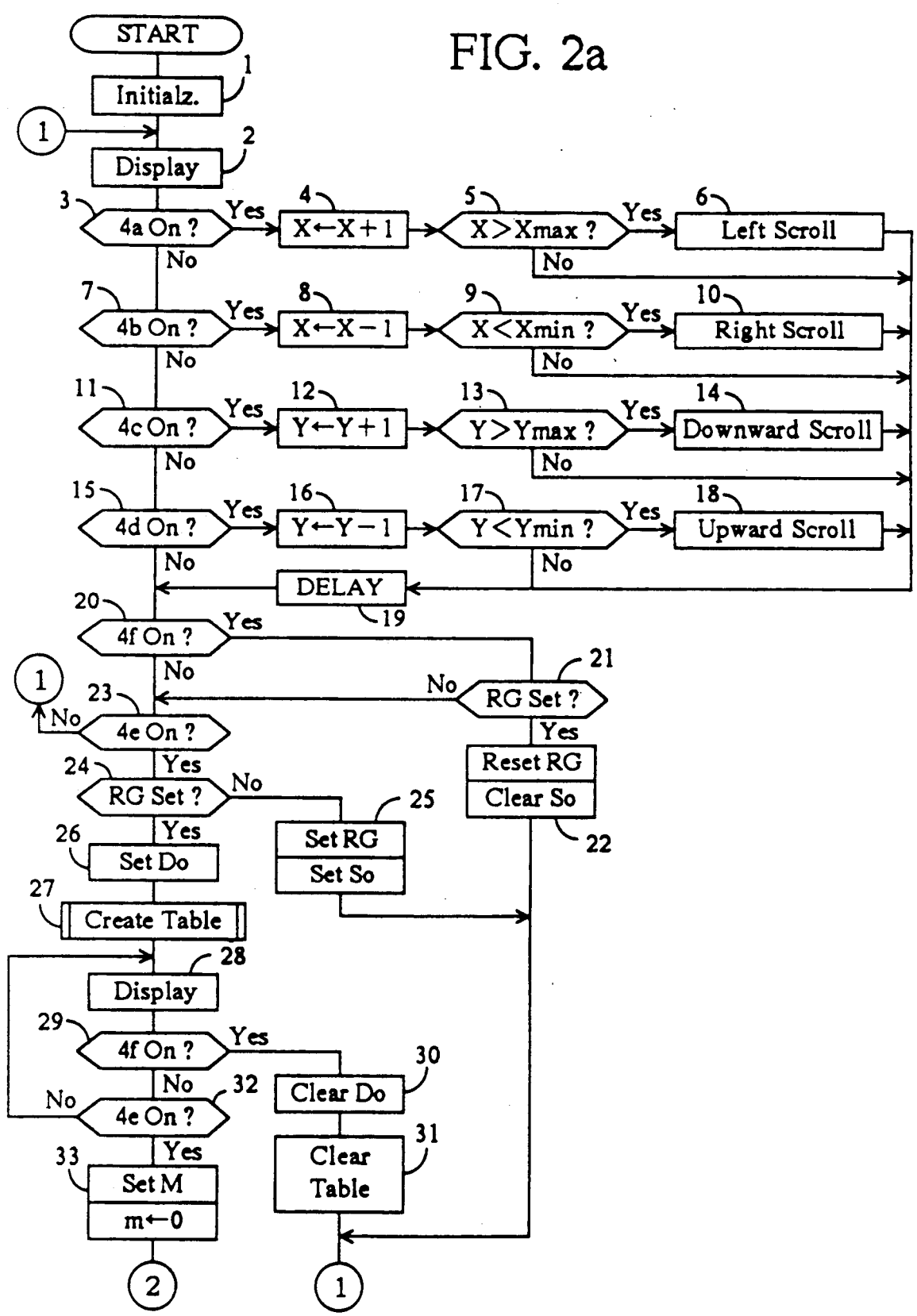
FIGS. 2a–2e are flowcharts illustrating the operation of the microcomputer 1 shown in FIG. 1.
Figure 2B:
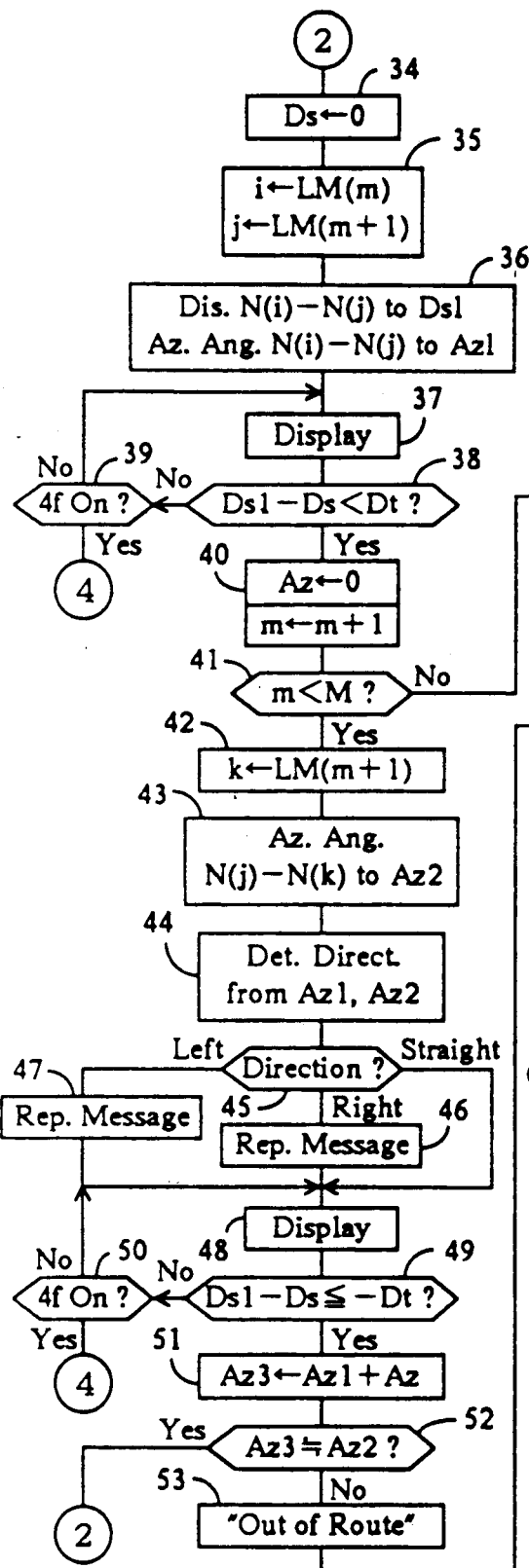
Figure 2B:
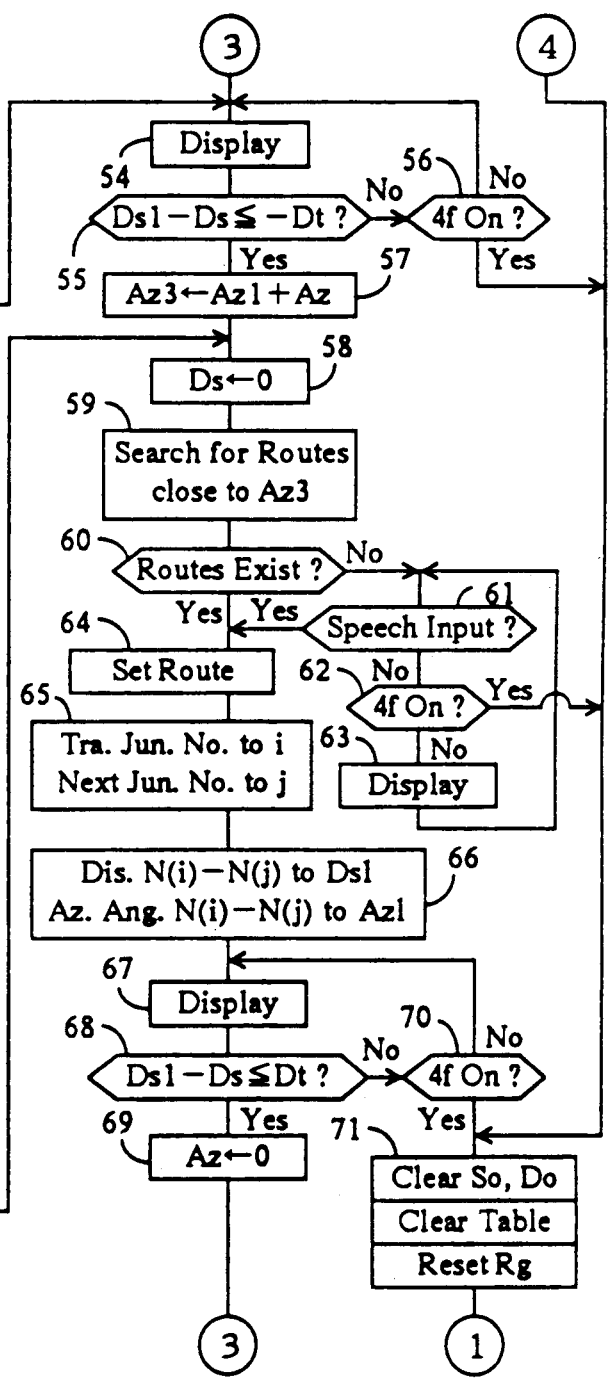
Figure 2C:
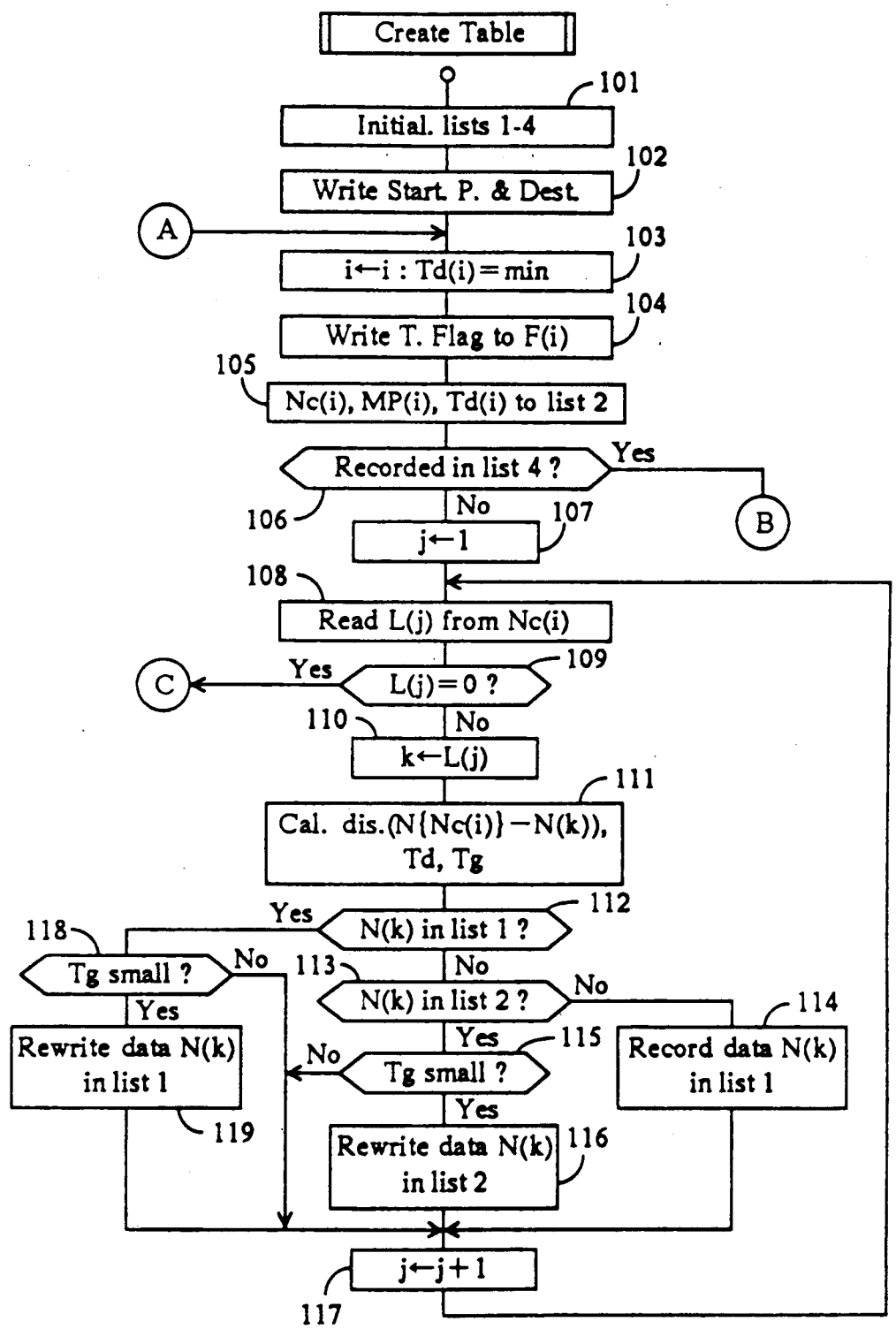
Figure 2D:
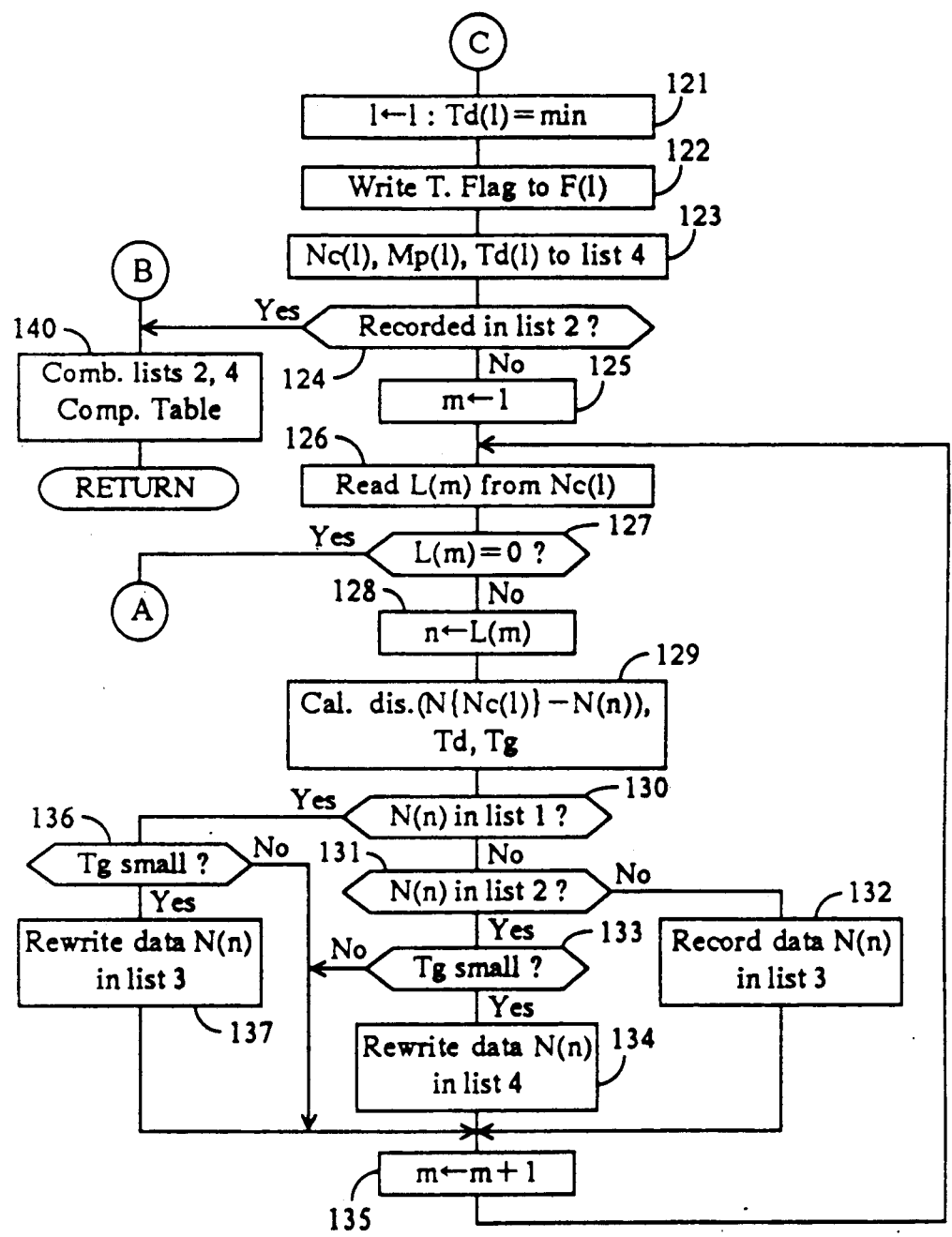

The operation of the CPU 1 is next described by referring to the flowcharts of FIGS. 2a-2e. Referring first to FIG. 2a, when the power is turned on and given electrical powers are supplied to various portions, the CPU 1 initializes registers and the memory excluding nonvolatile portions and resets flags. Then, the CPU reads data on maps from the CD-ROM (step 1).

Map data includes image data about ordinary maps and data about road junctions contained in the maps. The latter data about road junctions includes the coordinates of the junctions on maps and connective relations among the junctions. One example of the latter data is next described by referring to FIGS. 5 and 7.

FIG. 7 schematically shows road junctions and their connective relations. Each junction is indicated by a dot. Each road is indicated by a straight solid or broken line. As an example, junction N2 is connected to junctions N1, N3, N4, and N5. That is, 4 roads meet at junction N2. In the column indicated by Jun. No. 2 (Junction N2) of the table of FIG. 5, the coordinates of junction N2, data about connections, i.e., junction numbers N1, N3, N4, and N5, are put.

Maps and a cursor are displayed on the color CRT 2b according to the fetched data about the maps (step 2).

In processing of steps 3-23, the starting point and the target point are set according to the instruction keyed in by the operator. More specifically, when the key 4a is operated, an X register corresponding to a coordinate in the eastward or westward direction is incremented or decremented, respectively (step 4). When the key 4b is operated, the X register is decremented (step 8). When the key 4c is operated, a Y register corresponding to a coordinate in the northward or southward direction is incremented or decremented, respectively (step 12). When the key 4d is operated, the Y register is decremented (step 16). If the coordinates corresponding to the values held in the registers get out of the viewing screen, then the image is caused to scroll to the left (step 6), to the right (step 10), downward (step 14), or upward (step 18).

After a lapse of about 0.2 second (step 19), control returns to step 2 from step 23. Then, the cursor is brought to the position indicated by the coordinates corresponding to the values held in the X and Y registers. Thereafter, the above process is repeated. That is, if the key 4a, 4b, 4c, or 4d is repeatedly operated, then the cursor is shifted in a stepwise fashion at intervals of about 0.2 second.

When the cursor coincides with the starting point, the operator operates the key 4e to bring control from step 23 to step 24.

When the key 4e is operated first, flag RG which has been reset is set (step 25). The point specified by the cursor is recorded as a starting point $S_0$. In this operation, the coordinates of the specified location are taken as the coordinates of the starting point $S_0$. The numbers given to the junctions existing at both ends of the route containing the specified location are taken as data about the junctions. These coordinates and data are put in the region of the junction data table which contains data about the junction at the starting point $S_0$. Thus, the starting point $S_0$ is regarded as a normal junction.

This starting point $S_0$ can be corrected by operating the key 4f. In particular, when the key 4f is operated, control goes from step 20 to step 21 and then to step 22, where flag RG is reset. Junction data held in the region of junction number S in the junction data table is cleared, and provisional starting points $S_1$ and $S_2$ are reset.

After the operator specifies the starting point $S_0$ correctly, the cursor is moved in the same manner as in the above process. The key 4e is operated to specify a target location $D_0$. When the system is operated in the tracking mode, the junction crossed by the vehicle first is specified as the target location $D_0$.

Thus, control goes from step 23 to step 24. Since flag RG has been set, control proceeds to step 26, where the position specified by the cursor is recorded as the target location $D_0$. In this operation, the coordinates of the specified location are taken as the coordinates of the target location $D_0$. The numbers assigned to the junctions at both ends of the route containing the specified location are put in the region of junction number D of the junction data table which contains the coordinates of the target location $D_0$. In this way, the target location is regarded as a normal junction.

Subsequently, processing for creating connection data is carried out (step 27). This processing is described in detail by referring to the flowcharts of FIGS. 2b and 2c. To help understand the processing, we now consider a model shown in FIG. 3a. In this figure, each circle indicates a junction. A solid line connecting one circle to another indicates a route. The numeral or symbol put in a circle indicates a junction number. A number put around a route indicates the length of the route. Note that this length is independent of the length on the figure. In this example, the junction of junction number S is taken as the starting point. The junction of junction number D is taken as the target location. The rectilinear distance from each junction to the target location and the rectilinear distance to the starting point are put in close proximity to each junction. The former distance is put on the right side, whereas the latter distance is put on the left side.

Lists 1-4 are initialized (step 101). Lists 1 and 3 represent memories having regions to which owner pointers MP, transit flags F, junction numbers Nc, accumulated distances Td, and estimated distances Tg that correspond to successive list numbers are written, as shown in FIGS. 3b and 3d.

Lists 2 and 4 represent memories having regions to which junction numbers Nc, owner pointers MP, and accumulated distances Td that correspond to successive list numbers are written, as shown in FIGS. 3c and 3e. Of these lists, lists 1 and 2 are used to search for routes from the starting location. Lists 3 and 4 are employed to search for the routes from the target location.

Junction number S (starting point), accumulated distance Td=0, and estimated distance Tg=4 are put in the first column of list 1. Junction number D (the target location), accumulated distance Td=0, and estimated distance Tg=4 are put in the first column of list 3 (step 102).

The CPU searches list 1 for a list number which gives the short estimated distance Tg. This list number is stored in a register i (step 103). A transit flag is put in F (i) (step 104). Since this is the first search, i=1. Under this condition, the contents of list 1 are the same as Table 1 below. In Table 1 and subsequent tables, * indicates a transit flag.

TABLE 1

|   | MP | F | Nc | Td | Tg |
|---|----|---|----|----|----|
| 1 | —  | * | S  | 0  | 4  |
| 2 | —  | — | —  | —  | —  |

Junction number Nc (i), owner pointer MP (i), and accumulated distance Td (i) read from column i (=1) of list 1 are recorded in list 2 (the first column in FIG. 3c) (step 105).

List 4 is checked to see whether junction number Nc (i) recorded at this time has been already recorded in list 4 (step 106). If so, control proceeds to step 140, which will be described later. If not so, control goes to step 107.

Value "1" is held in register j (step 107). Connection data L (j=1) is read from the column of junction number Nc (i=1) of the junction data table (step 108). At this time, since L (j=1)=1, this value is stored in register k (step 110).

The distance d (=1) between junction N {Nc (i=1)} specified by junction number Nc (i=1) and junction N (k=1) specified by junction number k is calculated and added to the accumulated distance Td (i) (=0) that is measured from junction S to junction N {Nc (i)}, thus calculating the accumulated distance Td (=1) from junction S to junction N (k). The rectilinear distance (=3) from junction N (k) to the destination is added to the accumulated distance Td (=1). As a result, an estimated distance Tg (=4) is computed (step 111).

Junction N (k=1) is put neither in list 1 nor in list 2. Therefore, taking Nc (i=1) as an owner pointer, junction number k (=1) of the immediately previous junction N (k), the accumulated distance Td (=1), and the estimated distance Tg (=4) are inserted into list 1 (step 114). The result is that list 1 assumes the condition shown in Table 2 below.

TABLE 2

|   | MP | F | Nc | Td | Tg |
|---|----|---|----|----|----|
| 1 | —  | * | S  | 0  | 4  |
| 2 | S  | — | 1  | 1  | 4  |
| 3 | —  | — | —  | —  | —  |

Register j is incremented (step 117), and then control returns to step 108. Since L (j=2) is not recorded, control goes from step 109 to step 121.

The CPU searches list 3 for a list number giving the shortest estimated distance Tg. This number is stored in register l (step 121). A transit flag is inserted into F (l) (step 122). Since this is the first insertion, l=1. At this time, list 3 assumes the condition shown in Table 3 below.

TABLE 3

|   | MP | F | Nc | Td | Tg |
|---|----|---|----|----|----|
| 1 | —  | * | D  | 0  | 4  |
| 2 | —  | — | —  | —  | —  |

Junction number Nc (l), owner pointer MP (l), and accumulated distance Td (l) which are read from column l (=1) of list 3 are recorded in list 4 (the first column of FIG. 3e) (step 123).

List 2 is checked to see whether junction number Nc (l) recorded as this time has been already recorded in list 2 (step 124). If so, control goes to step 140, which will be described later. If not so, control proceeds to step 125.

Value "1" is held in register m (step 125). Connection data L (m=1) is read from the column of junction number Nc (l=1) of the junction data table (step 126). At this time, L (m=1)=3 and so it is stored in register n (step 128).

The distance d (=1) between junction N {Nc (l=1)} specified by junction number Nc (l=1) and junction N (n=3) specified by junction number n is calculated (step 114). This distance is added to the accumulated distance Td (l) (=0) between junction D and junction N {Nc (l)} to calculate the accumulated distance Td (=1) from junction D to junction N (n). Then, the rectilinear distance (=3) from junction N (n) to the starting point is added to the accumulated distance to compute estimated distance Tg (=4).

Since junction N (n=3) is put neither in list 3 nor in list 4, junction number n (=3) of the immediately previous junction N (n), accumulated distance Td (=1), and estimated distance Tg (=4) are inserted into list 3 (step 132). Nc (l=1) is taken as an owner pointer in this operation. List 3 assumes the condition shown in Table 4 below.

TABLE 4

|   | MP | F | Nc | Td | Tg |
|---|----|---|----|----|----|
| 1 | —  | * | D  | 0  | 4  |
| 2 | D  | — | 3  | 1  | 4  |

TABLE 4-continued

| | MP | F | Nc | Td | Tg |
|---|---|---|---|---|---|
| 3 | — | — | — | — | — |

Thereafter, register m is incremented (step 135) and then control goes back to step 126. Since L (m=2) is not recorded, control returns to step 103.

The CPU searches list 1 for a list number (i=2) which gives the shortest estimated distance Tg having no transit flag (step 103). A transit flag is inserted into F (i=2) (step 104). Junction number Nc (i), owner pointer MP (i), and accumulated distance Td (i) which are read from column i (=2) of list 1 are recorded in list 2 (the second column of FIG. 3c) (step 105).

List 4 is checked to see whether junction number Nc (i) has been already recorded in list 4 (step 106). Since it is not so, control goes to step 107.

Values 2, 5, 6, and S are recorded in the junction data table as connection data about the junction N (1) specified by junction number Nc (i). Value "1" is held in register j (step 107). Connection data L (j=1) which is 2 is read from the column of junction number Nc (i=2) of the junction data table (step 108) and stored in register k (step 110).

The distance d (=3) between junction Nc {Nc (i=2)} and junction N (k=2) is calculated (step 111) and added to accumulated distance Td (i) (=1) measured to junction N {Nc (i)}, thus computing accumulated distance Td (=4) between junction S and junction N (k). The rectilinear distance (5) from junction N (k) to the destination is added to this accumulated distance to calculate estimated distance Tg (=9) (step 111).

Since junction N (k=2) is put in neither list 1 nor in list 2, junction number k (=2) of the immediately previous junction N (k), accumulated distance Td (=4), and estimated distance Tg (=9) are inserted into list 1 (step 114). Nc (i=2) is taken as an owner pointer.

Then, register j is incremented (step 117). Control goes back to step 108, where connection data L (j=2) that is 5 is read from the column of the junction number Nc (i=2) of the junction data table (step 117). The data is stored in register k (step 110).

Accumulated distance Td (=2) of the route which extends from junction S to junction N (k=5) through junction N {Nc (i=2)} is calculated in the same manner as in the above process. Estimated distance Tg (=4) from the target point measured when this junction is selected is calculated (step 111).

Since this junction N (k=5) is put in neither list 1 nor in list 2, junction number k (=5) of junction N (k), accumulated distance Td (=2), and estimated distance Tg (=4) are inserted into list 1 (step 114). Junction number Nc (i=2) is taken as an owner pointer.

Connection data L (j)=6 is discussed under the condition j=3, in the same way as in the foregoing process. Junction number k (=6) of junction N (k=6), accumulated distance Td (=3), and estimated distance Tg (=8) are inserted into list 1 (step 114). At this time, junction number Nc (i=2) is taken as an owner pointer. Although connection data L (j)=S is also discussed under the condition j=4, this junction has been already inserted into list 1. Since estimated distance (4) recorded in the list is less than estimated distance Tg (=5) calculated at this time, list 1 is not modified. Thus, list 1 assumes the condition shown in Table 5 below.

TABLE 5

| | MP | F | Nc | Td | Tg |
|---|---|---|---|---|---|
| 1 | — | * | S | 0 | 4 |
| 2 | S | * | 1 | 1 | 4 |
| 3 | 1 | — | 2 | 4 | 9 |
| 4 | 1 | — | 5 | 2 | 4 |
| 5 | 1 | — | 6 | 3 | 8 |
| 6 | — | — | — | — | — |

Control goes from step 109 to step 121, where the CPU searches list 3 for a list number which offers the shortest estimated distance Tg having no transit flag. As a result, l=2 is obtained. A transit flag is inserted into F (l=2) (step 122). Junction number Nc (l), owner pointer MP (l), and accumulated distance Td (l) which are read from column l (=2) of list 3 are recorded in list 4 (the second column of FIG. 3e) (step 123).

List 2 is checked (step 124). Because junction number Nc (l) which is recorded at this time has been recorded, control proceeds to step 125.

As connection data about the junction specified by junction number Nc (l) (or N (3)), 2, 4, 6, 7, and D are recorded in the junction data table. Value "1" is held in register m (step 125). Connection data L (m=1) that is 2 is read from the column of Nc (l=2) of the junction data table (step 126) and stored in register n (step 128).

The distance d (=5) between junction N {Nc (l=2)} and junction N (n=2) is calculated (step 129) and added to accumulated distance Td (l) (=1) measured to junction N {Nc (l)}. Thus, accumulated distance Td (=6) from junction D to junction N (n) is calculated and added to the rectilinear distance (3) from junction N (n) to the starting point. In this way, estimated distance Tg (=9) is calculated.

Since junction N (n=2) is put in neither list 3 nor in list 4, junction number n (=2) of the immediately previous junction N (n), accumulated distance Td (=6), and estimated distance Tg (=9) are inserted into list 3 (step 132). Nc (l=2) is taken as an owner pointer.

Subsequently, register m is incremented (step 135) and then control goes back to step 126, where connection data L (m=2) that is 4 is read from the column of junction number Nc (l=2) of the junction data table. The data is stored in register n (step 128).

In the same way as the foregoing, accumulated distance Td (=2) of the route which runs from junction D to junction N (n=4) through junction N {Nc (l=2)} is calculated. Also, estimated distance Tg (=4) to the destination obtained when the junction is selected is calculated (step 129).

Since this junction N (n=4) is put in neither list 3 nor in list 4, junction number n (=4) of junction N (n), accumulated distance Td (=2), and estimated distance Tg (=4) are inserted into list 3 (step 132). Junction number Nc (l=2) is taken as an owner pointer.

Connection data L (m)=6 is discussed under the condition m=3. Junction number n (=6) of junction N (n=6), accumulated distance Td (=6), and estimated distance Tg (=8) are inserted into list 3 (step 132). At this time, junction number Nc (l=2) is taken as an owner pointer. Connection data L (m)=7 is discussed under the condition m=4. Junction number n (=7) of junction N (n=7), accumulated distance Td (=5), and estimated distance Tg (=11) are inserted into list 3 (step 132). Junction number Nc (l=2) is taken as an owner pointer. Connection data L (m)=D is also discussed under the condition m=5. Because this junction has been already put in list 3, and because estimated distance (4) put in it is less than estimated distance Tg (=5) calculated at this time, list 3 is not modified. Thus, list 3 assumes the condition shown in Table 6 below.

TABLE 6

|   | MP | F | Nc | Td | Tg |
|---|----|---|----|----|-----|
| 1 | —  | * | D  | 0  | 4  |
| 2 | D  | * | 3  | 1  | 4  |
| 3 | 3  | — | 2  | 6  | 9  |
| 4 | 3  | — | 4  | 2  | 4  |
| 5 | 3  | — | 6  | 6  | 8  |
| 6 | 3  | — | 7  | 5  | 11 |
| 7 | —  | — | —  | —  | —  |

Control goes back to step 103, where the CPU searches list 1 for a list number which offers the shortest estimated distance Tg having no transit flag. As a result, i=4 is derived. A transit flag is inserted into F (i=4) (step 104). Junction number Nc (i), owner pointer MP (i), and accumulated distance Td (i) which are read from the column of i (=4) of list 1 are recorded in list 2 (the third column of FIG. 3c) (step 105).

List 4 is checked to see whether junction number Nc (i) which is recorded at this time has been already recorded (step 106). Since it has not been recorded, control goes to step 107.

As connection data about the junction specified by junction number Nc (i=4), 1, 4, and 6 have been recorded in the junction data table. After value "1" is held in register j (step 107), connection data L (j=1) that is 1 is read from the column of junction number Nc (i=4) of the junction data table (step 108) and stored in register k (step 110).

In the same way as the foregoing, accumulated distance Td (=3) of the route which extends from junction S to junction N (k=1) through junction N {Nc (i)} is calculated. Estimated distance Tg (=6) from the target position obtained when the junction is selected is computed (step 111).

Because junction N (k=1) has been already put in list 1, and because the estimated distance (=4) put in it is less than estimated distance Td (=6) calculated at this time, control goes from step 118 to step 117 without modifying list 1. Then, register j is incremented, and control returns to step 108.

Connection data L (j=2) that is 4 is read from junction number Nc (i=4) of the junction data table (step 108) and stored in register K (step 110). Then, in the same manner as in the above process, accumulated distance Td (=3) of the route which extends from junction S to junction N (k=4) through junction N {Nc (i)} is calculated. Also, estimated distance Tg (=4) obtained when this junction is selected is computed (step 111).

Since junction N (k=4) is put neither in list 1 nor in list 2, junction number k (=4) of junction N (k=4), accumulated distance Td (=3), and estimated distance Tg (=4) are inserted into list 1 (step 114). At this time, junction number Nc (i=4) is taken as an owner pointer.

Register j is incremented. Connection data L (j=3)=6 is discussed. Accumulated distance Td (=3) and estimated distance Tg (=8) are obtained. In this case, junction N (k=6) is contained in list 1, and the estimated distance does not differ. Therefore, the contents of list 1 are not altered. Thus, list 1 assumes the condition shown in Table 7 below.

TABLE 7

|   | MP | F | Nc | Td | Tg |
|---|----|---|----|----|-----|
| 1 | —  | * | S  | 0  | 4  |
| 2 | S  | * | 1  | 1  | 4  |
| 3 | 1  | — | 2  | 4  | 9  |
| 4 | 1  | * | 5  | 2  | 4  |
| 5 | 1  | — | 6  | 3  | 8  |
| 6 | 5  | — | 4  | 3  | 4  |
| 7 | —  | — | —  | —  | —  |

Control goes to step 121, where the CPU searches list 3 for a list number giving the shortest estimated distance Tg which has no transit flag. As a result, l=4 is obtained. A transit flag is inserted into F (l=4) (step 122). Junction number Nc (l), owner pointer MP (l), and accumulated distance Td (l) which are read from the column of l (=4) of list 3 are recorded in list 4 (the third column of FIG. 3e) (step 123).

List 2 is checked to see whether junction number Nc (l) recorded at this time has been already recorded (step 124). Since this number has not been recorded, control proceeds to step 125.

As connection data about the junction specified by junction number Nc (l=4), values 3 and 5 are recorded in the junction data table. After value "1" is held in register m (step 125), connection data L (m=1) that is 3 is read from the column of junction number Nc (l=4) of the junction data table (step 126) and stored in register n (step 128).

In the same manner as in the above process, accumulated distance Td (=3) of the route running from junction D to junction N (n=3) through junction N {Nc (l)} is calculated. Also, estimated distance Tg (=6) from the destination obtained when the junction is selected is computed (step 129).

Because junction N (n=3) has been already put in list 3, and because the estimated distance (=4) put in it is less than estimated distance Td (=6) calculated at this time, control goes from step 136 to step 135 without modifying list 3. Register m is incremented, and control goes back to step 126.

Connection data L (m=2) that is 5 is read from the column of Nc (l=4) of the junction data table (step 126) and stored in register n (step 128). In the same manner as in the above steps, accumulated distance Td (=3) of the route which extends from junction D to junction N (n=5) through junction N {Nc (l)} is calculated. Also, estimated distance Tg (=4) obtained when the junction is selected is computed (step 129).

Since junction N (n=5) is put neither in list 3 nor in list 4, junction number n (=5) of junction N (n=5), accumulated distance Td (=3), and estimated distance Tg (=4) are inserted into list 3 (step 132). At this time, junction number Nc (l=4) is taken as an owner pointer. Thus, list 3 assumes the condition shown in Table 8 below.

TABLE 8

|   | MP | F | Nc | Td | Tg |
|---|----|---|----|----|-----|
| 1 | —  | * | D  | 0  | 4  |
| 2 | D  | * | 3  | 1  | 4  |
| 3 | 3  | — | 2  | 6  | 9  |
| 4 | 3  | * | 4  | 2  | 4  |
| 5 | 3  | — | 6  | 6  | 8  |
| 6 | 3  | — | 7  | 5  | 11 |
| 7 | 4  | — | 5  | 3  | 4  |
| 8 | —  | — | —  | —  | —  |

Control returns to step 103, where the CPU searches list 1 for a list number which gives the shortest estimated distance Tg having no transit flag. As a result, i=6 is obtained. A transit flag is inserted into F (i=6) (step 104). Junction number Nc (i), owner pointer MP (i), and accumulated distance Td (i) which are read from the column of i (=6) of list 1 are inserted into list 2 (the third column of FIG. 3c) (step 105).

List 4 is checked. Since junction number Nc (i) (=4) has been already recorded in list 2 (step 124), the processing is completed, and control goes to step 140, where lists 2 and 4 are combined to complete a connection data table showing routes extending from the starting point $S_0$ to the target point $D_0$, as shown in FIG. 6 (step 140).

Figure 3A:
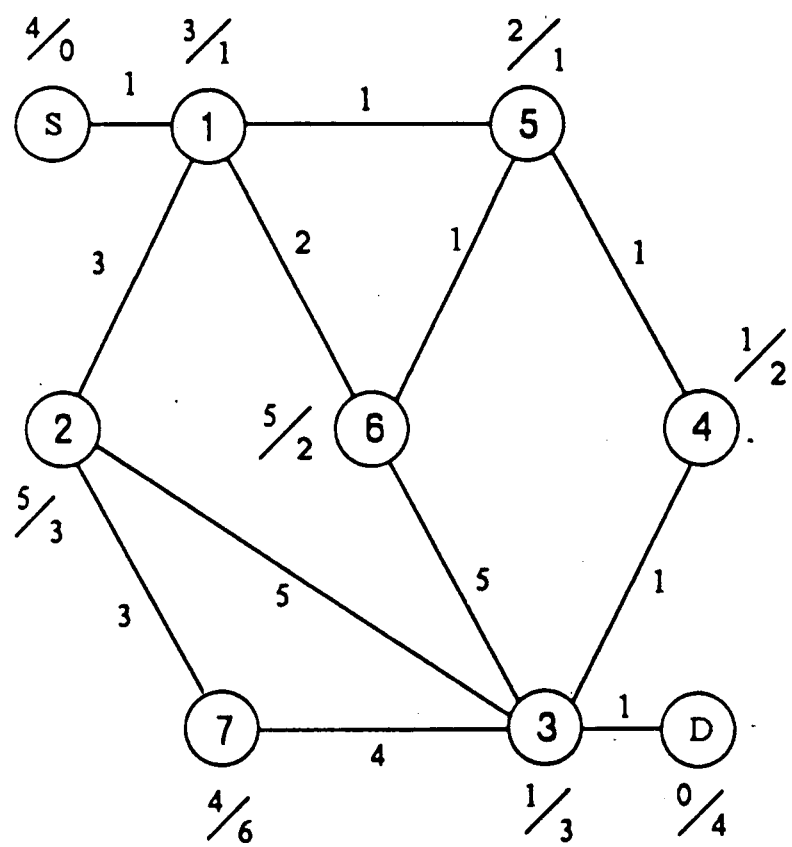
FIG. 3a is a diagram illustrating the processing performed by the microcomputer 1 shown in FIG. 1 to search for a route.

Situations not described in connection with FIG. 3a are now described. If the discussed junction is contained in list 1 or 3, and if the estimated distance is less than the estimated distance put in the list, the owner pointer at the junction, the accumulated distance, and the estimated distance are rewritten (step 119 or 137). If the discussed junction has been already recorded in list 2 or 4, and if the estimated distance is less than the estimated distance put in the list, then the owner pointer at the junction, the accumulated distance, and the estimated distance is rewritten (step 116 or 134).

After completing the processing for creating a connection data table, the route which is indicated by the connection data table created in the processing is displayed in a different color as a recommended route on a map presented on the color CRT 2b. Simultaneously, the length of the route is shown (step 28).

If the target location $D_0$ is specified incorrectly, it can be corrected by operating the key 4f. In particular, when the key 4f is operated, control goes from step 29 to step 30, where the region of junction number D of the junction data table is cleared. Then, the connection data table is cleared (step 31), and control goes back to step 2.

After the operator checks the displayed, recommended route, he or she operates the key 4e and starts the vehicle. If this operation is detected (step 32), then the number of data items contained in the connection data table is held in register M, and register m is reset to 0 (step 33). Then, control goes to step 34 and subsequent steps of the flowchart shown in FIG. 2b.

Register Ds is reset (step 34). In an interrupt operation, data about the reset accumulated distance traveled is stored in this register.

Figure 2E:
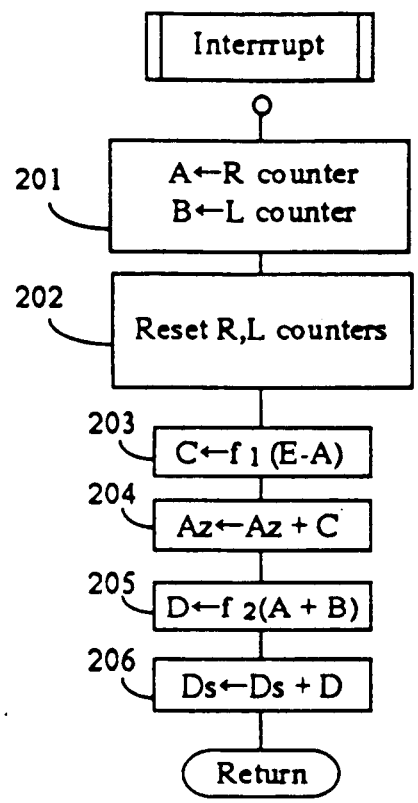

Before the following description is made, the interrupt operation is described by referring to FIG. 2e. Interruptions are caused at intervals of 0.5 second by clock pulses produced inside the CPU 1. The CPU calculates the distance traveled and the deflection angle from the values held in R counter 5a and in L counter 6a.

The values held in R counter 5a and L counter 6a are stored in registers A and B, respectively (step 201). These counters 5a and 6a are reset (step 202). R counter 5a counts the number of pulses produced by rotary pulse generator 5b during the interrupt period. L counter 6a counts the number of pulses produced by rotary pulse generator 6b during the period. These numbers of pulses correspond to the numbers of revolutions made by the axle shafts of the left rear wheel and the right rear wheel, respectively, i.e., correspond to the distances traveled by the left rear wheel and the right rear wheel, respectively, as described previously.

Figure 4:
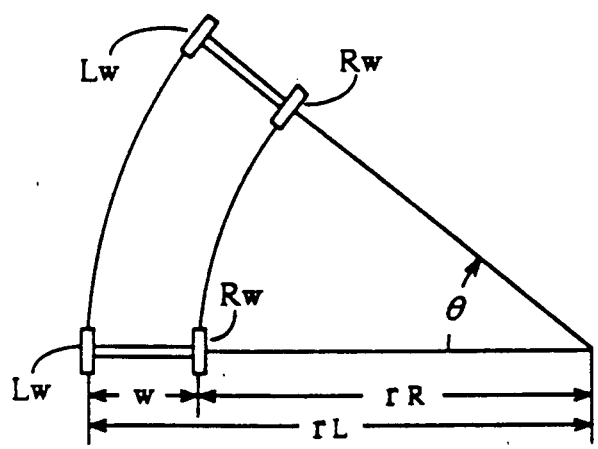
FIG. 4 is a diagram illustrating the principle on which the turning angle is determined from the difference between the distances of traveled by the right rear wheel and the left rear wheel, respectively, of an automobile.

Therefore, it is possible to calculate the deflection angle of the interruption period from these values. This is next described in detail by referring to FIG. 4.

When the automobile rotates through $\theta$ in radians in a clockwise direction, the right rear wheel travels a distance of a which is given by $r_R \cdot \theta$, where $r_R$ is the distance between the center of rotation and the right rear wheel $R_W$. The distance b traveled by the left rear wheel is given by $r_L \cdot \theta$, where $r_L$ is the distance between the center of rotation and the left rear wheel $R_W$. Accordingly, the deflection angle is given by $$\theta = (b-a)/(r_L - r_R) \quad (1)$$

In the above equation, the denominator $(r_L - r_R)$ of the right side is the wheel track W and so the deflection angle $\theta$ can be calculated from the difference between the distances traveled by the left and the right wheels.

Using appropriate constants, equation (1) is linearly transformed into a function $f_1$ to calculate the deflection angle from the difference between the total count obtained by L counter 6a, i.e., the value held in register B, and the total counter obtained by R counter 5a, i.e., the value held in register A. The clockwise direction is taken as the positive direction, and one revolution is 360°. In the present example, the function $f_1$ is stored in the form of a table in a ROM incorporated in the CPU 1.

The deflection angle of the interruption period is calculated from the difference between the value held in register B and the value held in register A by referring to the table stored in the ROM. Then, the angle is stored in register C (step 203).

The value held in register C is added to the value held in register $A_z$ (step 204). That is, the value held in register Az indicates the deflection angle of a certain period.

The distance traveled during one interruption period is calculated, using the function $f_2$ (step 205) and stored in register D. That is, the distance (in meters) traveled is calculated from the average of the values held in registers A and B. The function $f_2$ is stored in the form of a table in the ROM inside the CPU 1.

The value held in register D is added to the value held in register Ds. The value held in register Ds indicates the accumulated distance traveled during a certain period (step 206).

Referring again to FIG. 2b, since register Ds has been reset (step 34), data about the accumulated distance traveled thereafter is stored in an interruption. If m=0, the value held in register Ds is the distance traveled from the starting point.

The m-th and (m+1)th data items are read from the connection data table and held in registers i and j, respectively (step 35). These values indicate the numbers of the successive junctions existing in the route. As described previously, in the present example, the starting point and the target location are treated as normal junctions. If m=0, then i=S, i.e., the junction number of the starting point is indicated. The distance between junctions N (i) and N (j) is calculated and stored in register Ds1 (step 36). The positions of the junctions N (i) and N (j) are indicated by the values of i and j, respectively. The azimuth angle of the route interconnecting these junctions is found and stored in register Az1. In the present example, the azimuth angle is measured in degrees from due north on the map. The clockwise direction is taken as the positive direction, and one revolution is 360° (see FIG. 8).

Since the coordinates of the starting point and the direction of movement, i.e., the junction to be crossed next, are specified, the present location is found from the value held in register Ds. Specifically, as shown in FIG. 8, it is assumed that the automobile V is located at junction N (i) at a certain instant of time. If the junction N (j) is designated as the junction to be crossed next, then the automobile moves along the route interconnecting junctions N (i) and N (j). The present position of the automobile V is found from the data about the accumulated distance traveled from junction N (i), i.e., from the value held in register Ds.

In the loop consisting of steps 37-39, the difference between the values held in registers Ds1 and Ds and the operation of the key 4f are monitored. At the same time, the present location is displayed by means of the cursor on the route interconnecting junctions N (i) and N (j) on the color CRT 2b according to the value held in register Ds. If the difference between the values held in registers Ds1 and Ds, respectively, i.e., the distance from the present location to the next junction {junction N (j)}, become less than a certain value Dt, control goes to step 40 and subsequent steps. In other words, the loop consisting of steps 37-39 waits for the automobile V to go into an area which has a radius of Dt and whose center is located at the next junction {N (j)}, as shown in FIG. 8. In the present example, the radius Dt is set to about 30 m.

Register Az is reset to 0, and register m is incremented (step 40). If the value held in register m is less than the value held in register M, then control proceeds to step 42 and subsequent steps to operate in the navigational mode, because data indicating the next junction number is inserted in the connection data table. If the value held in register m exceeds the value held in register M, data indicating the next junction number does not exist in the connection data table and so control proceeds to step 54 and subsequent steps. Then, the system operates in the tracking mode.

The navigational mode is first described. The (m+1)th data item in the connection data table is read out and stored in register k (step 42). The azimuth angle of the route interconnecting junctions N (j) and N (k) is found and stored in register Az2 (step 43).

The azimuth angle of the presently followed route is stored in register Az1. The next intended direction of movement is determined by comparing the value held in register Az1 with the value held in register Az2. In the example shown in FIG. 8, the azimuth angle of the route interconnecting junctions N (j) and N (k) is larger than the azimuth angle of the route interconnecting junctions N (i) and N (j). That is, the value held in register Az2 is larger than the value held in register Az1. Therefore, the automobile V should turn to the right at the junction N (j).

A decision is made to determine whether the automobile should turn to the right or to the left (step 45). If it should turn to the right, the message "Please turn to the right." is reproduced through the speaker 7b (step 46). If it should turn to the left, the message "Please turn to the left." is reproduced through the speaker 7b (step 47). If it should move straight, no message is reproduced.

The loop consisting of steps 48-50 waits for the automobile V to go out of the area which has radius Dt and whose center is located at junction N (j), as shown in FIG. 8. If the vehicle leaves the area, the value held currently in register Az, i.e., the deflection angle created while the automobile V moves the distance Dt around junction N (j), is added to the value held in register Az1. The sum is stored in register Az3 (step 51). In the present example, the azimuth angle is represented in degrees divided by 360. In conformity with this, a value added to the value held in register Az3 is divided by 360.

The value held in register Az3 is compared with the value held in register Az2 (step 52). If the driver correctly selects the recommended route, both values are substantially the same. Then, control goes back to step 34. Subsequently, each time the automobile passes across a junction, the present location is found from the junction, and a decision is made to determine whether the vehicle should turn to the right or to the left.

If the value held in register Az3 differs from the value held in register Az2 by a value exceeding a tolerable range, then the message "The vehicle went out of the route." is reproduced through the speaker 7b (step 53). Then, the system operates in the tracking mode.

In this case, register Ds is reset to 0 (step 58). Then, the CPU searches for a junction which is connected to junction N (j) and has an azimuth angle that is closest to the value held in register Az3. If an adequate route is found, the route is treated as the route selected by the driver (step 64). If no appropriate route is found, the loop consisting of steps 61-63 waits for the driver to utter a message indicating whether the vehicle should be turned to the right or to the left. If the driver utters the word "Migi (Right in Japanese)", "Hidari (Left)", or "Sonomama (Straight)", while control is in this loop, then the route selected by the driver is adopted according to the entered word (step 64).

The junction number of the crossed junction is stored in register i, and the junction number of the junction corresponding to the other end of the adopted junction is stored in register j (step 65).

The distance between junctions N (i) and N (j) indicated by the values of i and j, respectively, is calculated and stored in register Ds1 (step 66), in the same way as in step 36. The azimuth angle of the route interconnecting these junctions is found and stored in register Az1.

In the same way as in the above process, the loop consisting of steps 67-69 waits for the automobile to enter the area which has radius Dt and whose center is located at the next junction N (j). If the automobile enters this area, then register Az is reset (step 70). The loop consisting of steps 54-56 waits for the automobile to go out of this area. Then, the deflection angle obtained while the vehicle passes across junction N (j) is found.

The value held in register Az is added to the value held in register Az1. The present azimuth angle of the automobile is found and stored in register Az3 (step 57). The value held in register Az3 is used to search for the route selected by the driver in step 59, in the same way as the foregoing.

During the processing described thus far, the cursor always indicates the present location of the automobile and so the moving automobile is tracked. During the execution of the processing, if the key 4f is operated, the processing is discontinued. The starting point $S_o$ and the target location $D_o$ are cleared (step 71), in the same way as in the foregoing. The connection data table is cleared, and flag RG is reset. Then, control returns to step 2 of the flowchart of FIG. 2a.

In the above example, the length of the route is accumulated. Instead, the elapsed time may be measured. Also, the region may be searched for the best route from either the starting point or the target point. Also in the above example, the present invention is applied to a system which searches for the route to be taken by an automobile. Obviously, the invention is applicable to other land vehicles and also to vehicles other than land vehicles.

As described thus far, in accordance with the present invention, when a first and a second point in a network of roads that can be followed by a vehicle are specified, the novel system searches for a route which connects the first point to the second point at the shortest estimated distance, using information about the network, while accumulating the distance from the first point. This shortest route is selected.

Figure 9A:
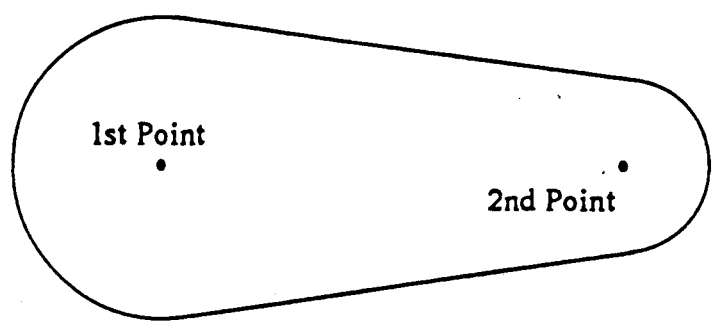
FIGS. 9a and 9b are pictorial views showing areas searched in accordance with the present invention.
Figure 9B:
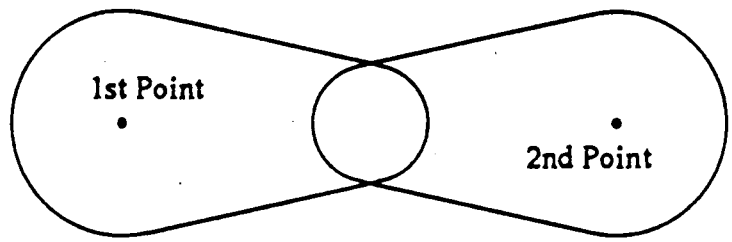

In this method, the CPU searches for the route while adding a weight to the accumulated distance from the first point, according to the estimated distance to the second point. As the search is continued, the searched area is narrowed. As a result, the area is restricted to an egg-shaped area around the second point, as shown in FIG. 9a. In this way, the search has directionality. Hence, the amount of processing is quite small.

As already described, the same search can be made from both first and second points. Then, the route is determined from the junction at which two searched roads first meet. In this case, egg-shaped searched regions as described above approach and meet each other, thus reducing the searched area further. In the simplest example, the searched area is halved compared with the case in which the search is made from only one side.

Where information on the positions of junctions of routes followed by the vehicle and information on their interconnection are used, the novel system searches for roads connected to the first point while accumulating the distance from the first or second point each time a junction is encountered. Therefore, the processing is performed discretely. This further reduces the amount of processing.

What is claimed is:

1. An apparatus for searching for a route to be followed by a vehicle, said apparatus comprising:

a storage means storing information about a network of roads that can be followed by the vehicle;

a specifying means for specifying a first point and a second point in the network; and a processing means which, when the first and the second points in the network are specified, searches for a route connecting the first point to the second point at a shortest estimated distance while accumulating the distance from the first point, searches for a route that connects the second point to the first point at a shortest estimated distance while accumulating the distance from the second point, and selects a road that extends from one of the two points and first meets a road extending from the other of the two points to determine the optimum route;

wherein said storage means stores information about the positions of junctions of the roads that can be followed by the vehicle and information about the interconnection of said junctions, and wherein said processing means searches for roads connected to the first point, while accumulating the distance from the first point each time a junction in the network is encountered and narrowing the search at said junction, and searches for roads connected to the second point while accumulating the distance from the second point each time a junction in the network is encountered and narrowing the search at said junction.

* * * * *